United States Patent
Fujisawa et al.

(10) Patent No.: US 7,297,063 B2
(45) Date of Patent: Nov. 20, 2007

(54) ON-LINE GAME METHOD

(75) Inventors: Tomonori Fujisawa, Tokyo (JP); Shouji Satou, Kuroiso (JP)

(73) Assignee: Kabushiki Kaisha Eighting, Tokyo (JP)

( * ) Notice: Subject to any disclaimer, the term of this patent is extended or adjusted under 35 U.S.C. 154(b) by 419 days.

(21) Appl. No.: 10/490,034

(22) PCT Filed: Sep. 19, 2002

(86) PCT No.: PCT/JP02/09650

§ 371 (c)(1),
(2), (4) Date: Mar. 19, 2004

(87) PCT Pub. No.: WO03/026764

PCT Pub. Date: Apr. 3, 2003

(65) Prior Publication Data

US 2004/0242326 A1   Dec. 2, 2004

(30) Foreign Application Priority Data

Sep. 19, 2001  (JP) ............................. 2001-284335

(51) Int. Cl.
  *A63F 13/10*  (2006.01)
  *A63F 9/24*  (2006.01)

(52) U.S. Cl. ........................................ 463/43; 463/1

(58) Field of Classification Search .................. 463/24, 463/1, 36, 3, 4, 37, 40, 16, 43, 44
See application file for complete search history.

(56) References Cited

U.S. PATENT DOCUMENTS

| 5,746,602 A | 5/1998 | Kikinis |
| 6,200,216 B1 * | 3/2001 | Peppel ........................ 463/1 |
| 6,398,651 B1 * | 6/2002 | Yamada ...................... 463/43 |
| 6,709,336 B2 * | 3/2004 | Siegel et al. ................ 463/43 |

OTHER PUBLICATIONS

Abstract, JP 2001-1024689, Publication date: Jan. 26, 2001, Applicant: DDI Corp.
Abstract, JP6274402, Publication date: Sep. 30, 1994, Applicant: Fujitsu Ltd.

* cited by examiner

Primary Examiner—Robert E Pezzuto
(74) Attorney, Agent, or Firm—Manabu Kanesaka

(57) ABSTRACT

Strengthening a relation between "products" and a virtual space, and improving values of both game characters and the "products" mimicking the characters by stimulating users' affection to original products. In an online game method, a product carrying an ID code assigned thereto and a number of image characters reflecting features of the product and correlated to the ID code are previously prepared, and a user can use the image characters as characters for the online game by inputting the ID code in the online game to register the image characters therein.

6 Claims, 6 Drawing Sheets

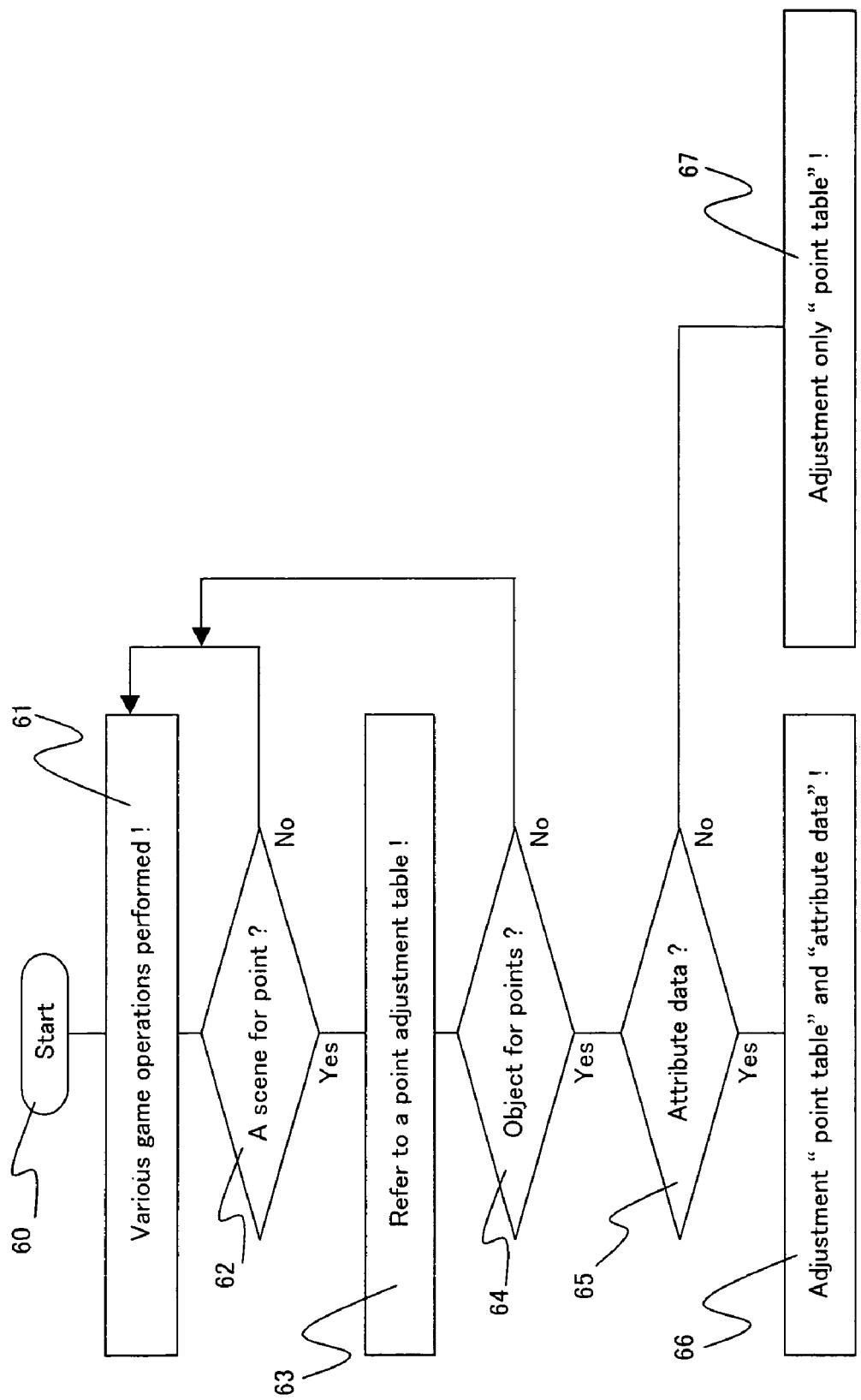

US 7,297,063 B2

ON-LINE GAME METHOD

TECHNICAL FIELD

The present invention relates to an online game provided through a network, and more specifically to a method of providing an online game using one or more image characters.

BACKGROUND TECHNOLOGY

Most of online games provided through and played on a network virtually start and virtually end, namely are completely realized within a virtual space. On the other hand, there have been known businesses of selling toys each mimicking a character appearing in an online game to aim the synergetic effect between the online game and the toy.

However, the relation between a character appearing in an online game and a toy mimicking the former is only in the state where one only resembles to the other, and the roles are independent respectively, and therefore the relation between the two is not strong, and online game players' affection to characters appearing in online games does not substantially contribute to increasing favor to and popularity of toys mimicking the characters. Further there has been no case in which a number of characters are prepared in correspondence to a toy, or in which various attributes varying for each user are given to each character.

There has been known a trial for promoting sales of a product by disclosing the product with an ID for application to a present campaign on the campaign site which can be accessed from, for instance, a mobile telephone, and the problems as described above have not been solved.

DISCLOSURE OF THE INVENTION

The present invention relates to a method of providing an online game using one or more image characters, and more specifically to a method of strengthening the relations between a virtual space in which various characters act and all types of "products" including, not only toys described above, but also stationery products, home appliances, general merchandises, foods, and other types of products, and further premiums and promotional products for the purpose of improving values of both the game characters and products mimicking the characters by stimulating users' affection to original products.

In a method of providing the online game according to the present invention, a product carrying an ID code assigned thereto and a number of image characters reflecting features of the product and correlated to the ID code are previously prepared, and a user can use the image characters as characters for the online game by inputting the ID code in the online game to register the image characters therein.

Preferably the image characters mimic the corresponding products. Preferably a user is required to make a membership registration in the online game prior to inputting the ID code. Preferably the product is a premium for a prize awarding machine. Preferably the registered image characters are shown in a form of an album for allowing users to visually check the image characters. Further preferably a game point is given to a registered member simultaneously when the image characters are registered.

BRIEF DESCRIPTION OF THE INVENTION

FIG. 6 is a flow chart showing a method of calculating points in the online game.

BEST MODE FOR CARRYING OUT THE INVENTION

The method of providing an online game according to the present invention is described in relation to an embodiment thereof in which the method is applied to a stuffed toy as a premium for a prize awarding machine (a stuffed toy game machine or other arcade games for acquisition of a product) with reference to the related drawings.

Figure 1:
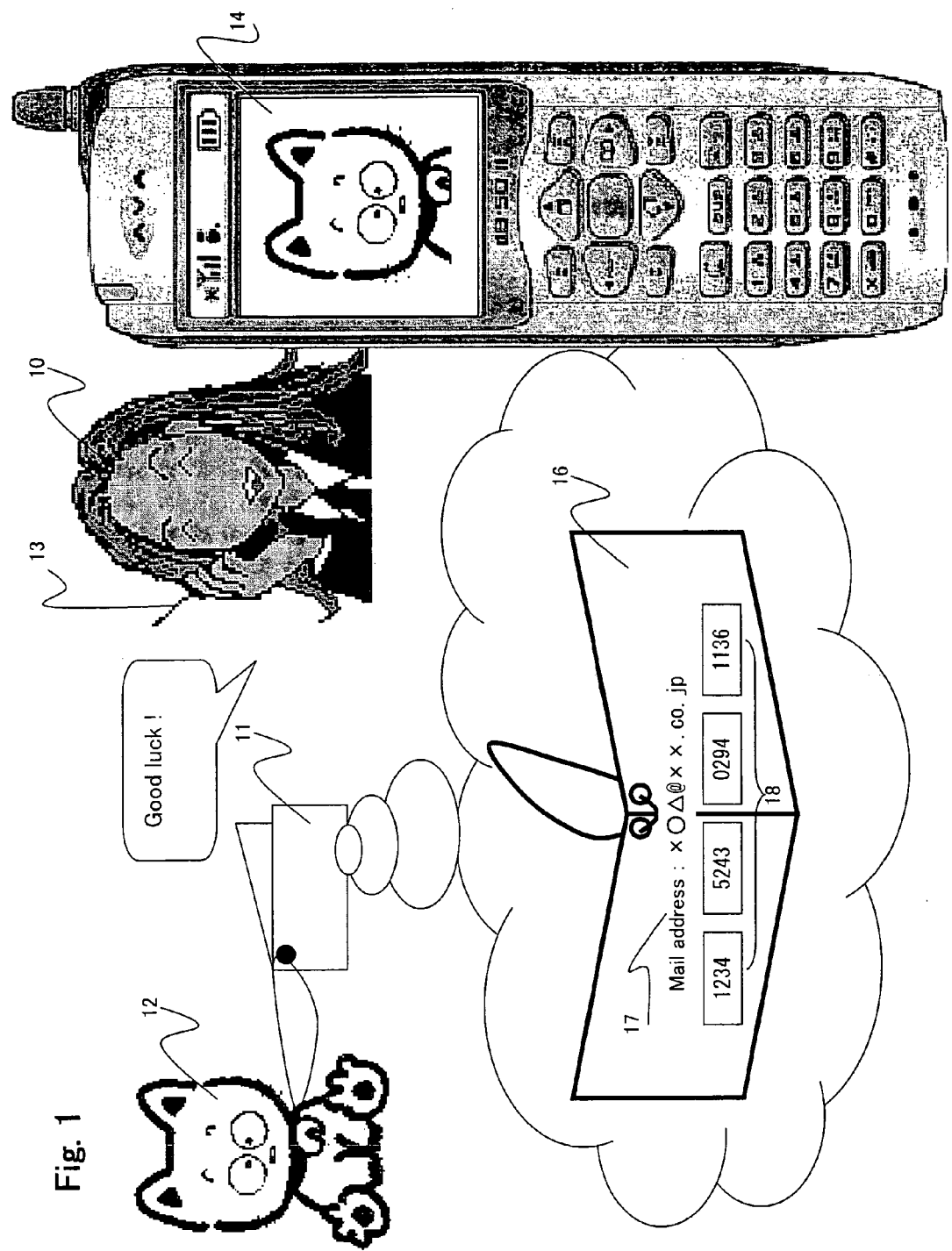
FIG. 1 is a view showing a general image for a method of the present invention in which a stuffed toy and a mobile telephone are used.

FIG. 1 is a view showing a general image for the present invention in which a stuffed toy and a mobile telephone are used, and the figure shows a user 10 utilizing the service; a mobile terminal 13 owned by the user 10; and a stuffed cat toy 12 with a price tag 11 attached thereon. Displayed on a display screen 14 of the mobile terminal 13 is an image character correlated to the stuffed cat toy 12 as a "product" in the present invention in a virtual space, and this image character is transmitted from a service center providing this service.

The tag 11 shown with the enlarged form in a dialogue balloon has a mail address 17 of a provider of this service and an ID code 18 printed thereon. The ID code 18 may be provided as, for instance, a seal adhered on a product. The ID code 18 is not always required to be a character or a sign, and such items as bar code, two-dimensional bar code, and a musical sound signal may be used as the ID code 18.

The user 10 having acquired the stuffed toy 12 from the prize awarding machine carries out the work described below for registration in the service center, when the stuffed toy 12 as a product is correlated to an image character in a virtual space, and subsequently the image character acts as the user's favorite, a pet or an alter ego of the user in an online game provided from the service center. When the online game goes on, the user's emotional involvement in the image character increases, and the user feels as if the stuffed toy 12 acts as the user itself. As a result, sometimes the user may overlap an image of the stuffed toy 12 at the user's hand on the image character displayed on the mobile terminal 13 and may say "Good luck" to the stuffed toy 12.

Further communication between the users 10, 10 using the image character is possible.

Figure 5:
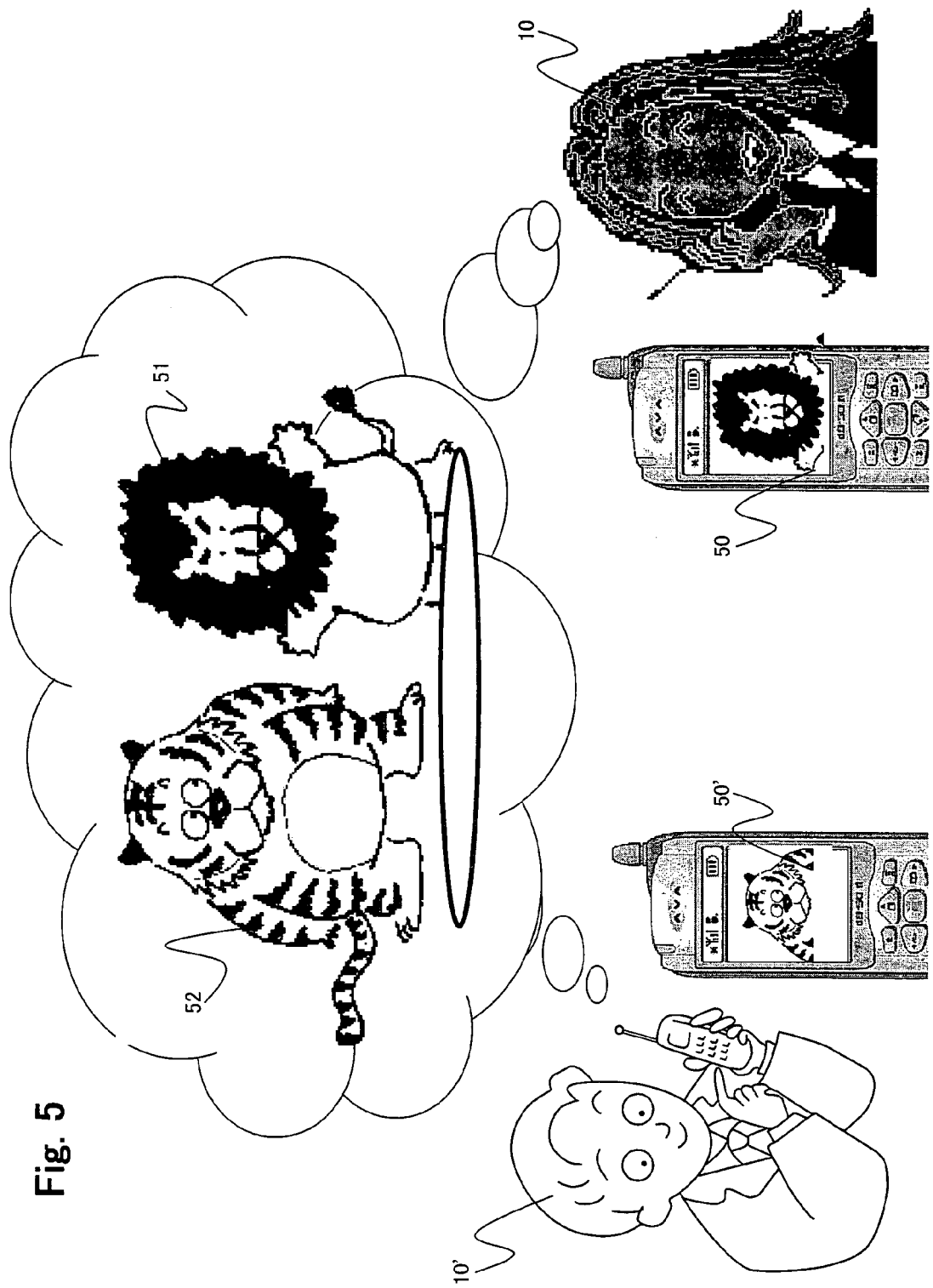
FIG. 5 is an image diagram showing utilization of an image character in the online game.

FIG. 5 is a view showing an image indicating utilization of the image characters in the online game, and in this figure, image characters 50, 50' are displayed on mobile terminals owned by the users 10, 10', and further stuffed toys 51, 52 imagined by the users 10, 10' are shown in a dialogue balloon.

In an online fighting game, the users 10, 10' may imagine a scene in which a stuffed toy as an original of one user's image character fights with the other's in a virtual space when seeing the image characters 50, 50' displayed on each mobile terminal.

As described above, a product in the present invention includes, but not limited to, stationery products, home appliances, general merchandises, foods, other types of products as well as premiums such as a stuffed toy 12 and toys, and further prizes and promotional products.

In a method of the online game according to the present invention as described above, a product carrying the ID code assigned thereto and a number of image characters reflecting features of the product and correlated to the ID code are previously prepared, and one of the image characters is registered by inputting the ID code in the online game to possibly use the image character as a character for the online game, and a membership registration is preferably required in the online game prior to inputting the ID code. The procedure of a membership registration is described with reference to the flow chart of FIG. 2.

Figure 2:
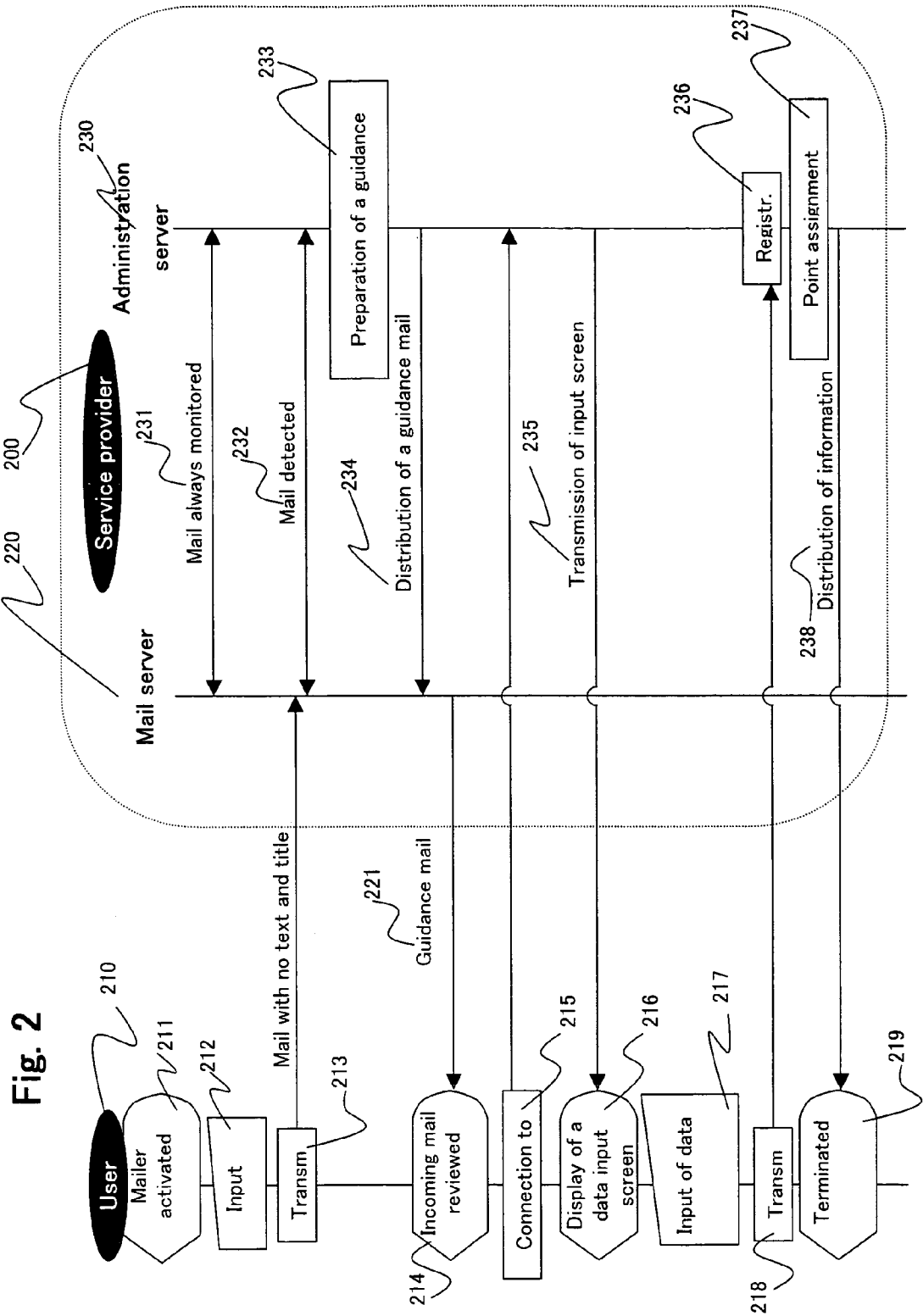
FIG. 2 is a flow chart showing a procedure of membership registration in a method of the present invention.

FIG. 2 shows a service provider 200 and a user 210 with the intention of receiving the service, and there are a mail server 220 and an administration server 230 provided at the center of the service provider 200.

The user 210 activates a mailer normally equipped with a mobile terminal 13 (a mobile telephone, a personal computer, or other communication devices for possibly connecting to a network such as the Internet) (211); inputs the mail address of a provider of this service 17 in the address inputted section (212); and sends a mail (213). Whether a text and a title are input in the mailer or not depends on a direction from the service center, and in this case a text and a title are not inputted.

When the mail with no text and title is received at the mail server 220 of the center, the administration server 230 constantly monitoring the mail server 220 to receive a mail (231) detects the arrival of a mail (232) and fetches the mail into the administration server 230. The administration server 230 decodes a mail address of the mail sender and creates a data area (record) specific to the member identified by the decoded mail address. Then the administration server 230 creates an input screen based on the data area (233) and distributes both a guidance for the service and the URL showing the site for said input screen to the decoded mail address. The mail is transmitted to the user 210 (221) via the mail server 220 (234).

The user 210 checks the incoming mail (214), connects to the URL displayed on the display, and requires a data input screen for membership registration (215). Then the user 210 makes the data input screen distributed from the administration server 230 displayed on the mobile terminal 13 (216); inputs specified items such as the user's name and a password (217); and transmits the data to the administration server 230 (218).

The administration server 230 records the data transmitted from the user on the member-specific data area so that the user is registered as a member (236). On this occasion, a member registration point given for a registered member may be registered (237). A "member registration point" is a point used when a member utilizes services such as an online game or shopping service.

The member registration data of the user 210 thus created is transmitted to the user 210 for confirmation (238), and displayed on a screen of the mobile terminal (219).

Figure 3:
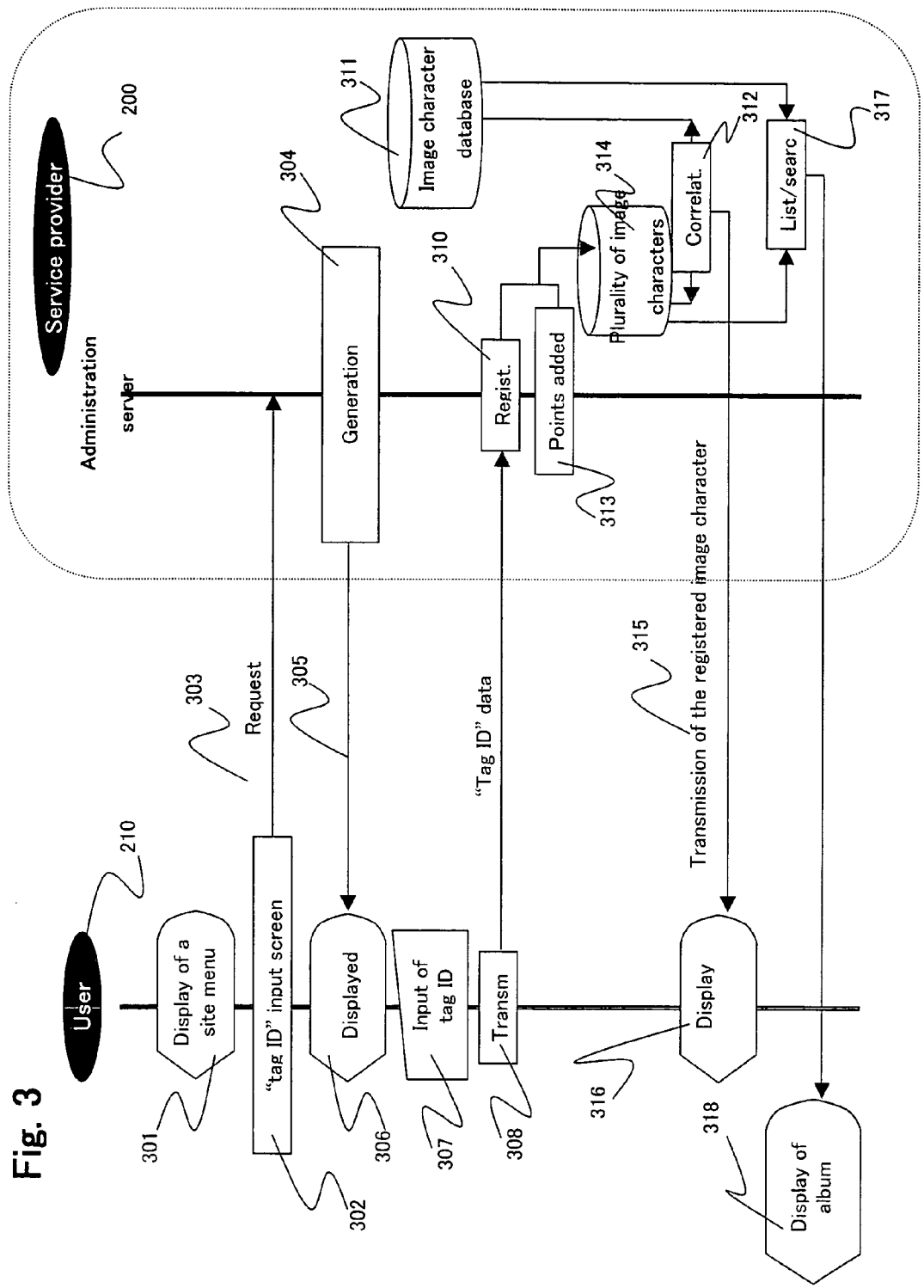
FIG. 3 is a flow chart showing a procedure of registration of an image character in a method of the present invention.

Then, a procedure of registration of an image character with reference to a flow diagram in FIG. 3, that is, a method of correlating a "product (a stuffed cat toy)" to an image character in a virtual space is described. In this figure as well as in FIG. 2, the flow chart shows a user 210 on the left side and a service provider 200 on the right side.

The user 210 (hereinafter referred to as a member) registered as a member as described in relation to FIG. 2 makes the member-specific menu display limited by a password or the like displayed on the mobile terminal 13 (301). Then, the member selects a "tag ID input" menu displayed on the same display (302) and transmits a request signal for the tag ID input screen (303). A "tag ID" is an ID code 18 assigned to a tag 11 of a stuffed toy 12. The administration server 200 having received the signal creates a tag ID input screen for said member (304) and transmits the screen to the mobile terminal of said member (305).

When the tag ID input screen is displayed on the member's mobile terminal 13 (306), the member inputs the "tag ID" (an ID code 18) in the input screen (307) and transmits the data to the administration server 200 (308).

The tag ID data received as described above is registered on the member-specific data area in the administration server 200 (310), and the data is correlated to the relevant image character searched from the database 311 accumulating image characters having been prepared by the center in advance therein (312). Preferably points given when the image character is registered are added (313). The "character registration point" is a point used, like the member registration points, when a member utilizes services such as an online game or shopping in this service, and the points stimulates the users' desire to get a stuffed toy 12 and to buy products.

A plurality of image characters can be registered (314) and selected to be used when online games or other service as described below are utilized.

The registered image character is transmitted to the member's mobile terminal 13 (315) and displayed on the display (316). According to the member's request, the image character can be searched as needed (317) and preferably, for instance, shown in a form of an album (318).

As described above, the image character is shown as an illustration mimicking the acquired stuffed toy 12, and photographs, pictures or the like can be adapted on behalf of the illustration when they have features of the corresponding products. In some cases, songs, melodies or musical sounds may be employed.

When the registered image character is used as an online game character as described above, products such as a stuffed toy has been acquired or bought by the member so that the member's affection to the image character is developed and the favorable image and the popularity of original products such as a stuffed toy are promoted.

Moreover, in the method described above, a database of a large number of image characters related to the ID code is compiled and multiple characters can be prepared for one stuffed toy. Specifically, product attribute data information matching to the ID code is possibly set as the "attribute data" with the attribute parameter for each character set, and the desire to buy the same product can be facilitated. Furthermore, by setting parameters with data of interests for each registered member, it is possible to make a game point more complex and an online game more exciting. The method, for instance, comprises the steps of preparing multiple product attribute data information matching to ID codes; displaying one randomly extracted from said matching data and information converted by the parameter table as "default setting for attribute data" when inputting the ID code; making the member select one from the data information; and converting the setting for attribute data as the member selected.

This is described below with reference to FIG. 4.

Figure 4:
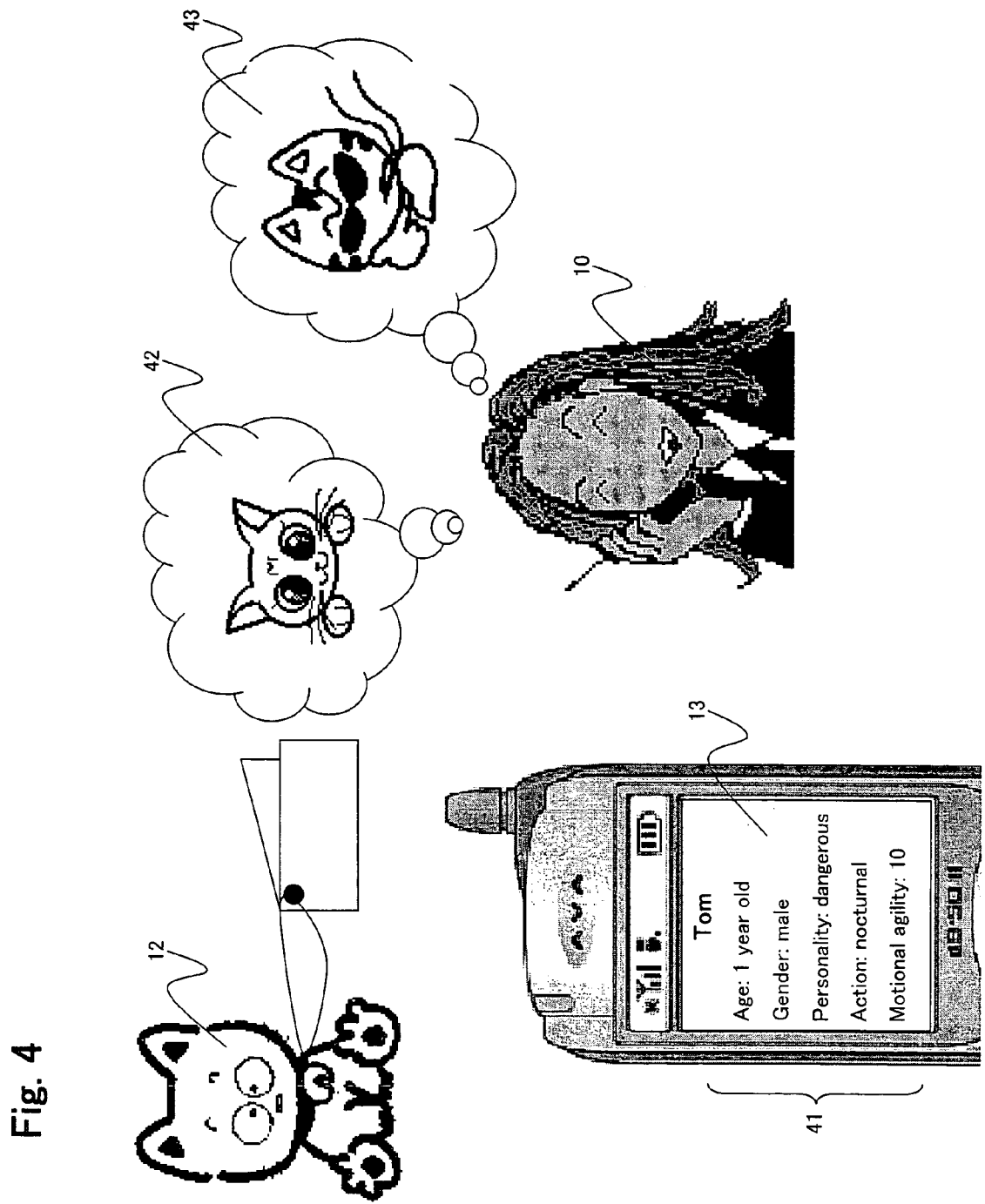
FIG. 4 is a view illustrating change of an image character according to attribute data set in the online game.

FIG. 4 is a view showing an image of the possible change of game points acquired in an online game when the attribute data of an image character used in an online game is employed, and the figure shows the changes of an image character when the attribute data is set.

Namely, the attribute data 41 is displayed on the mobile terminal 13 owned by a user (member) 10, and image characters 42, 43 imagined by the member 10 when the setting of attribute data is set are shown in the balloons. It is designed for the member to have a great deal of interest in an online game through the setting of attribute data by the member 10.

The method of calculating points in the online game when the attribute data is added as described above is described below with reference to the flow diagram shown in FIG. 6.

When the game selected by a member is started (60) and various game operations are performed (61), a point section is generated therein. In the point section, "whether it is a stage for giving points or not" is judged (62), and a point adjustment table prepared for each game is referred to when it is judged to be a stage for giving points (63) to judge "whether the stage is an object for points or not" (64). When the stage is not recognized as an object for giving points owing to the member's mistake even though the stage is one for given points, the points are kept unchanged and the game operations continue to be performed like in the case where it is judged that "the stage is not one for giving points" (61).

On the other hand, when it is judged that "the stage is an object for giving points", attribute data items correlated to the point adjustment table are referred to (65). It is needless to say that there is an item with no relation to any attribute data item in some point adjustment tables. When there is data designated by a point adjustment table in attribute data item, the points set in the point adjustment table plus those corresponding to the attribute data are given to the member (66). It is also needless to say that there are plus points and minus points.

When there is no attribute data item correlated to any point adjustment table, points are only those set in the point adjustment table without referring to attribute data item (67).

The change of points according to the attribute data setting is intended not only to be for enjoying an online game, but also for deepening the affection to the image character when playing online games with the image characters, which leads to increase the users' desire to buy products corresponding to image characters.

The present invention is not only effective for distributing passwords for online games by making use of product tags, but also has the profound effects for increasing favorable image and popularity of corresponding products through affection to online game characters. Further, the present invention has the remarkable effects that a number of characters corresponding to one product can be prepared on an online game, or that various attributes differentiated for each user can be given to each character.

The invention claimed is:

1. A method of providing an online game comprising the steps of:
    preparing a product carrying an ID code assigned thereto;
    storing in a data base a number of image characters reflecting features of the product and correlated to the ID code of the product;
    transmitting the ID code of the product to an administration server of a service provider comprising the data base;
    searching in the data base at least one image character correlated to the ID code;
    selecting the at least one image character and registering the at least one image character;
    transmitting the selected at least one image character to a mobile terminal; and
    displaying said transmitted at least one image character as the online game character in the online game on the mobile terminal.

2. The method of providing an online game according to claim 1, wherein the image character mimics the corresponding product.

3. The method of providing an online game according to claim 1, wherein membership registration in the online game is made prior to transmitting the ID code.

4. The method of providing an online game according to claim 1, wherein the product is a premium for a prize awarding machine.

5. The method of providing an online game according to claim 1, wherein the registered at least one image character is possibly shown in a form of an album.

6. The method of providing an online game according to claim 1, wherein a game point is given to a registered member simultaneously when the image character is registered.

* * * * *